3,271,177
WAX COMPOSITIONS AND COATED ARTICLES
George G. Rumberger, Kalamazoo, Mich., assignor to KVP Sutherland Paper Company, Kalamazoo, Mich., a corporation of Delaware
Filed Apr. 30, 1965, Ser. No. 452,329
25 Claims. (Cl. 106—272)

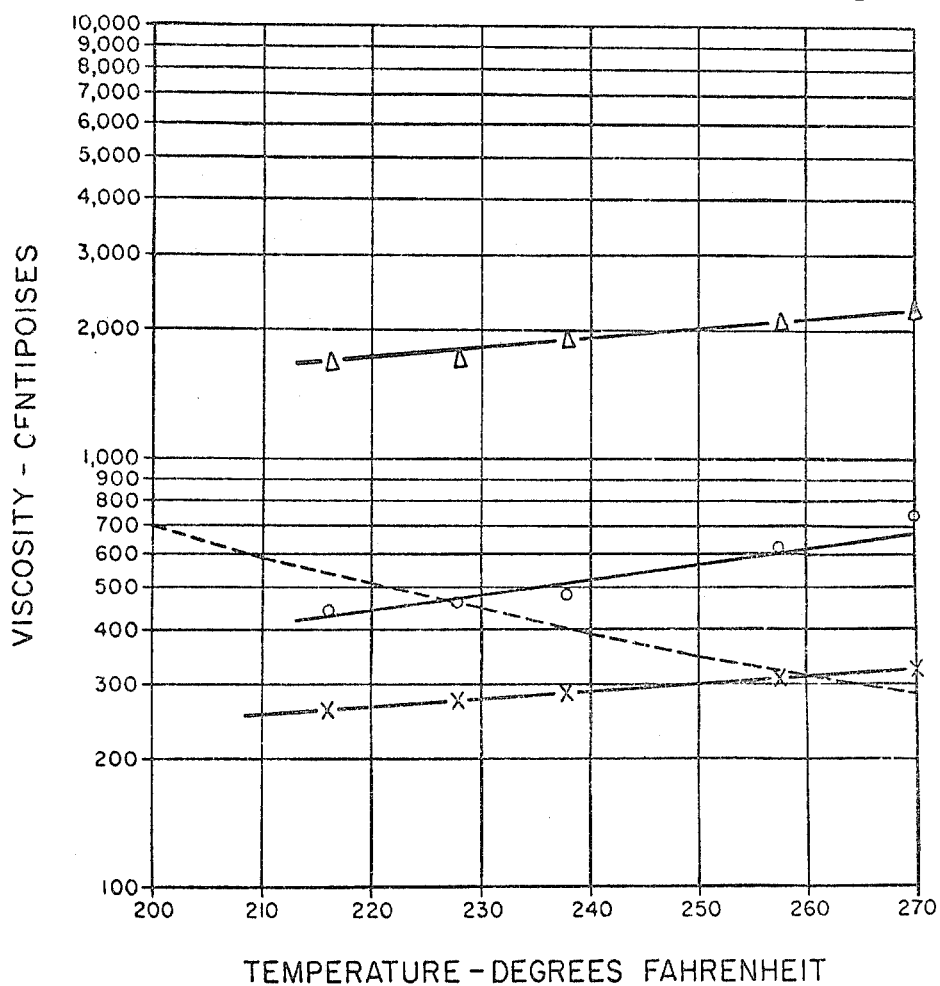

This application is a continuation-in-part of my prior-filed copending application, Serial No. 133,490, filed August 23, 1961, now abandoned.

The present invention relates to new and useful wax compositions and more particularly concerned with improved wax compositions which are especially suitable for coating and laminating sheet materials, films thereof, sheet materials embodying the same, and carton blanks and cartons constructed of such coated or laminated sheet materials.

In the coating and laminating of sheet materials, especially fibrous sheet materials, it has long been known that it is desirable to prevent penetration of the sheet materials and to control flow-off and squeeze-out by controlling the viscosity of the coating or laminating composition. Although wax is ideally suited as a moisture-proofing composition and adhesive, when used alone it lacks suitable body to prevent penetration and flow-off when applied as a hot melt to a great number of base sheet materials.

Many attempts have made to improve the coating and application characteristics of waxes, especially the petroleum waxes, by incorporation of additives. Generally, these have been high molecular weight polymers of the hydrocarbon type, such as natural rubber, polyisobutylene, butyl rubber, polyethylene, and the like. These are, to a certain extent, compatible with hydrocarbon waxes, but generally require high power mixing equipment and extensive mixing programs to accomplish satisfactory incorporation therein. In addition, incorporation of these materials has generally resulted in some impairment of the water-vapor and gas proofness of the wax.

Other materials which have been added to or incorporated into waxes are the semi-soluble materials such as metallic soaps, resins, polymers and pigments. These generally from thixotropic colloidal systems which are difficult to apply and which are very responsive to heat and mechanical working, and therefore characterized by a correspondingly poor pot life. Like the hydrocarbon polymers, these additives result in some impairment of the water-vapor and gas proofness of waxes.

A simple method for increasing the viscosity of waxes, and thereby preventing penetration and squeeze-out when coating or laminating sheet materials therewith, without recourse to the materials listed above and their attendant difficulties and disadvantages, has long been sought. Moreover, it is desirable that such method and composition accomplish the desired end without undue cost. Also, in such method and composition, the inherent protective and adhesive properties of the waxes used should not be lessened or destroyed. In addition, it is desirable that such method and composition result in increased viscosity of the wax, e.g., petroleum wax or petroleum wax compositions, without greatly altering the various physical properties thereof, and also be compatible with additives which might, in the same composition, be used for gloss, blocking, release, slip, pigmentation, or other desirable properties, but which are not essentially viscosity builders.

It is an object of the present invention to provide such an advantageous and highly desirable method of increasing the viscosity of wax and wax compositions and such advantageous and highly desirable wax compositions of increased viscosity, as well as films thereof, sheet materials laminated or coated therewith, and carton blanks and cartons produced from such coated or laminated sheet materials. Additional objects of the invention will be apparent to one skilled in the art, and still other objects will become apparent hereinafter.

It has now been found that the foregoing and additional objects are accomplished by the provision of a novel method of compounding waxes, and especially petroleum waxes, together with certain other materials, to produce wax compositions of preselected viscosity levels in a simple manner without detracting from the inherent properties of the wax employed, the resulting compositions being moreover compatible with such additives as might be used to impart additional desirable characteristics thereto. Through a particular selection of starting waxes, e.g., hydrocarbon waxes, and wax-affecting additives, a wide range of properties can be built into these pre-planned compositions, making them suitable for coating, laminating, heat sealing, caulking, dipping, water-proofing, and the like.

Briefly, my new method comprises suspending a hydrous adsorbent powder of a particular type in the melted wax or wax composition and expelling water of hydration of the hydrous adsorbent powder in the presence of a surface activator (otherwise known as a surface active agent, wetting agent, or emulsifier), of a particular type, as may be conveniently accomplished by employing an elevated temperature and subjecting the mixture to stirring, preferably with high mechanical or hydraulic shear, as will be more fully explained hereinafter.

Since the complexes present in the wax compositions of the invention are formed in situ, the ultimate compositions are much more economical and homogeneous than viscous systems previously devised from preactivated bentonitic clays of the ion exchange type, which latter agents must be prepared in an aqueous system, dried, and redispersed in a hydrocarbon medium to form a gel structure. The complexes of the invention also differ physically from the ion exchange treated bentonites in the manner by which the activator is attached to the porous adsorbent structure, as will also be more fully explained hereinafter. Natural bentonite, although an ion exchanger, per se is not an adsorbent and, to become an adsorbent, must be leached with a strong acid. Vol. I, Encyclopedia of Chemical Technology, p. 229 (Interscience Publishers, 1952).

One component of my compositions is a mineral or synthetic or chemically regenerated inorganic material, generally identified as a hydrous adsorbent. These materials have the capacity to form porous structures of high surface area, and may or may not have ion exchange capacity. I believe the porosity of the material in its final state to be more important than the charge density of the surface. Of the natural mineral hydrous adsorbents acceptable for the practice of this invention, attapulgite, fuller's earth, hectorite, illite, saponite, bauxite and porous hydrous adsorbent montmorillonite clays are examples. Of the synthetic or chemically regenerated minerals, hydrated alumina, magnesium aluminum silicate, hydrated silica gel and porous zeolites are examples. Any hydrous inorganic adsorbent may be used, so long as it contains adsorbed or combined water or gas, the elimination of which results in a change, i.e., decrease, of the pore diameter or inter crystalline spacing upon the application of dehydration or degassing conditions. It is of the utmost importance that the hydrous adsorbent contain some water of crystallization or hydration at the time of incorporation, hence its classification as a "hydrous" adsorbent.

The surface activators used in my compositions are fatty acid amides characterized by having at least one aliphatic, preferably paraffinic, chain of at least eight, and preferably ten to thirty, or even more, carbon atoms. I have found that amides produced from the fatty acids of natural animal and vegetable fats of particular adaptability, as these in themselves are ordinarily meltable solids compatible with wax. As representative acids, the amides of which are suitable, may be mentioned 12-hydroxystearic acid, erucic acid, myristic acid, behenic acid, archidic acid, tallow acids, cocoanut oil acids, stearic acid, oleic acid, castor oil fatty acids, hydrogenated derivatives of the foregoing, other saturated or unsaturated fatty acids, and the like. Also of use are amides produced from acids and lactones made by the oxidation of petroleum waxes, such as for example oxidized microcrystalline wax having a saponification number of sixty or above.

I prefer to use amides of tallow acids or cocoanut oil acids or their hydrogenated derivatives as these are low in cost and commercially available in quantity.

As previously indicated, I have found that certain critical factors must be observed in compounding my new and improved wax compositions, otherwise satisfactory results will not be obtained. The surface activator and the hydrous adsorbent must both be present contemporaneously, and loss of water of hydration of the adsorbent must occur in the presence of the surface activator. One convenient way in which to carry out the method of the invention and effect the aforesaid reaction involves heating the wax to between its melting point and about 300 degrees Fahrenheit before incorporation of the mineral adsorbent and the surface activator. In general, I have found a temperature range of about 220 degrees Fahrenheit to about 280 degrees Fahrenheit to be most satisfactory. When the wax has been brought to this temperature, the surface activator is generally added first. The adsorbent is usually added slowly with sufficient stirring to dissipate occluded gas and free and bound water from the adsorbent as it foams to the surface. When foaming ceases, the mixture is further admixed, and preferably violently agitated with a high-shear mixer. After from a few minutes to several hours, depending on mixing power, a thixotropic viscous composition results. During this mixing stage, the temperature may rise to about 350 to 400 degrees Fahrenheit due to a high power input, although generally the temperature rise will be much lower.

The surface activator may also be added after the adsorbent, or both may be added together. When the surface activator is added after the adsorbent, a second foaming period will usually be observed, apparently due to displacement of bound water from the adsorbent by the surface activator.

After the composition has been prepared, it may be stored for long periods of time in the melted state with only mild stirring. On the other hand, the composition may be allowed to congeal and then be remelted for use with only mild stirring.

When laminating sheets together, I prefer to use a wax base comprising largely microcrystalline petroleum waxes for my compositions, that is, containing fifty to 100 percent of the wax as microcrystalline waxes and the rest as paraffin wax. Microcrystalline waxes have been adequately described in the literature, and a full description of their production and properties will not be given here. They will generally have a melting point of about 130 degrees Fahrenheit to 200 degrees Fahrenheit, and a needle penetration value of about ten to sixty. Their refractive indices at 210 degrees Fahrenheit will range from about 1.4325 to 1.4450 for the sodium D line.

When coating compositions are to be made, they will ordinarily and preferably contain paraffin wax as the major component. Paraffin waxes are considered to be all waxes which contain over fifty percent of material adductible with urea, and will include all waxes made from overhead stocks in the production of lubricating oil by distillation of crude petroleum. They will have a melting point of about 110 to about 170 degrees Fahrenheit and a viscosity less than about eight centistokes at 210 degrees Fahrenheit. When the terms "paraffin wax" or "paraffin waxes" are employed, microcrystalline waxes are not encompassed thereby.

Other hydrocarbon waxes may be employed to equal advantage, such as synthetic waxes made by catalytic synthesis from carbon monoxide and hydrogen, more commonly referred to as the Fischer-Tropsch synthesis, by the hydrocracking of polyethylenes of high molecular weight, by polymerizing ethylene to a low molecular weight, or waxes produced by other synthetic processes which yield normally solid hydrocarbons. Certain naturally-occurring waxes may also be employed in my novel process and products, such as ceresin, montan wax, candelilla wax, beeswax, ozocerite, carnauba wax, bayberry wax, and the like.

The foregoing waxes or mixtures thereof may be used as a base for my coating or laminating compositions as needs require, especially when other additives such as polyethylene, polyisobutylene, rosin glyceryl esters, polyterpenes, ethylene-vinylacetate copolymers, ethylene isopropyl alcohol telomers, butyl rubber, natural rubber, chlorinated rubber, rosin derivatives, ester gums, or the like are to be included. The type and extent of the additives employed will of course depend to a large extent upon the intended application, e.g., coating or laminating, and the particular end use of the finished product.

The following examples will illustrate the mode of operation and character of my new method and compositions, but are not to be construed as limiting.

EXAMPLE 1

Microcrystalline wax derived from Louisiana Crude Oil, M.P. 160–170° F. (Microvan 1650, Standard Oil Company of New Jersey) was melted at 250° F., surface activator added, then powdered attapulgite containing seventeen percent moisture (Attagel 20) was added slowly with mild stirring until foaming ceased. The mixture was then transferred to a heated high-shear agitator (Waring Blendor) and agitated at high speed for five minutes, after which the viscosity was measured using a Brookfield Synchroelectric Viscometer. After cooling to solidification and remelting, the viscosity was again determined and the laminating strength determined by using the composition to laminate together two sheets of 27-pound parchmentized paper. Results are given in Table I following:

Table I

| | | 250° F. Viscosity, cps. | | |
|---|---|---|---|---|
| | | When mixed | After reworking | Laminating strength |
| 1 | 100% microcrystalline wax, M.P. 160–170° F. (Control). | 15 | 15 | Fair. |
| 2 | 82% microcrystalline wax, M.P. 160–170° F. 15% powdered attapulgite, 17% moisture. 3% condensate of lauric acid and diethanolamine (Onyx Super Amide L-9). | 24,000 | 24,000 | Excellent. |

EXAMPLE 2

A composition was made up of 1.67% hydrogenated tallow amide (Armid HT, Armour Chemical Co.), 13.33% powdered attapulgite having a 17% moisture content (Attagel 20, Minerals and Chemicals Co.), and microcrystalline wax of Mid-Continent origin having a melting point of 155–165° F. (Ceretak, Bareco Wax Division of Petrolite Corp.), using the mixing procedure of Example 1. The composition had a viscosity of 250 centipoises when measured at twenty revolutions per minute with a Brookfield Synchroelectric Viscometer. A film of this composition was used to laminate the following pairs of sheet materials together using eighty to 110 pounds per ream (24 x 36—500) of laminant: (1) fifty lb. dry waxed paper to fifty lb. dry waxed paper, (2) 59 lb. coated book paper to .014″ solid news cylinder board (180–185 lb. per ream), and (3) fifty lb. dry waxed paper to .014″ solid news cylinder board. The thickness of the wax films as determined by micrometer measurements were about .007″ to .009″, but there was no appearance of strike-through or squeeze-out. Adhesion was excellent, resulting in good laminating strength. When samples were heated to 135° F. for sixteen hours in an oven, laminating strength was maintained and no staining was evident. The laminated sheets were found suitable for fabrication into carton blanks by scoring and cutting on a press, and completely satisfactory cartons were erected from the thus-prepared carton blanks.

EXAMPLE 3

Using the composition of Example 2, 59 lb. coated book paper was laminated to 55 lb. dry waxed paper using 20, 35, 60, 70 and 105 pounds per ream of the laminating composition. There was no strike-through of the laminant or excessive squeeze-out. The laminated sheets did not delaminate when held in an oven at 135° F. for sixteen hours. Samples containing 20 and 35 pounds per ream of composition were suitable for wrapping foodstuffs. Samples containing 60, 70 and 105 pounds per ream of laminating composition were suitable for fabrication into cartons. The food wrappers and cartons prepared from these materials were in all respects acceptable.

As hereinbefore explained, I employ, as wax-soluble surface activator, a fatty acid amide. The following example illustrates results that can be obtained with representative members of this class of compounds.

EXAMPLE 4

A number of surface activators were tested in compositions composed of three percent surface activator, ten percent powdered hydrous attapulgite having a particle size ranging from about two microns to about .02 micron with an average particle size of about .14 micron, containing seventeen percent moisture (Attagel 20) and 87% laminating and coating grade microcrystalline wax derived from Pennsylvania Crude Oil, M.P. 150–160° F. (Quaker State L–500), using the mixing procedure of Example 1, except that a high-shear Kady Mill was substituted for the Waring Blendor. Viscosity was measured at several rotational speeds on a Brookfield Synchroelectric Viscometer. The compositions were also tested for laminating ability by making lamination tests on a laboratory laminator at 250° F. using a variety of paper and paperboard sheets, using amounts of laminating agent ranging from fifteen to 150 lbs. per ream. Results are given in Table II.

*Table II*

| Surface activator | Viscosity, c.p.s. at 260-270° F. | | | Laminating ability |
|---|---|---|---|---|
| | 20 r.p.m. | 10 r.p.m. | 2 r.p.m. | |
| Control—None | 30 | | | Poor—struck through completely. |
| Hydrogenated tallow amides containing— 22% hexadecanamide 75% octadecanamide and 3% octadecenamide (Armid HT) | 430 | 680 | 2,500 | Excellent. |
| Cocoanut acid amides containing— 8% octanamide 7% decanamide 49% dodecanamide 17% tetradecanamide 9% hexadecanamide 2% octadecanamide 6% 9-octadecenamide and 2% 9,12-octadecadienamide (Armid C) | 750 | 1,260 | 4,800 | Do. |
| Oleic acid amides containing— 6% octadecanamide 91% octadecenamide and 3% 9,12-octadecadienamide (Armid O) | 70 | 140 | 350 | Fair—slight strike through. |

Primary, secondary, and tertiary amines of hydrogenated tallow acids, stearic acid, and 12-hydroxystearic acid, when used with attapulgite, failed to give a viscosity increase higher than the attapulgite when tested alone, whereby it is shown that the action of my surface activators on hydrated adsorbent clays is different than with ion-exchanging bentonites, which react in aqueous systems with these chemicals to produce hydrocarbon gelling adducts. This is apparently because a different type of reaction mechanism is involved which, under the conditions employed in the method of the present invention, appears to involve a contraction of the porous structure of the hydrated adsorbent about the hydrophilic portion of the surface activator, thus producing a hydrophobic colloidal structure in situ upon reaction of the surface activator with the hydrated adsorbent. Experience has shown that when the hydrated adsorbent is first dehydrated and then reacted with the surface activator, even under conditions of high shear and elevated temperature, the same effects are not obtained, and this is believed to be due to the necessity of a shrinking of the porous structure of the hydrated adsorbent about the surface activator as its water of hydration is being released. When the amide surface activators are employed, the contraction of the porous structure of the hydrated adsorbent appears to be about the nitrogen moiety of the surface activator molecule, thereby allowing the oleophilic, e.g., hydrocarbon, chains to remain free and unhindered in the combined structure, thus providing hydrophobic qualities in situ in the reaction mixture. It is moreover believed that Van der Waal's forces operate between the pendant oleophilic aliphatic, e.g., hydrocarbon, chains of the structure thus produced and the oleophilic hydrocarbon chains present in the waxes used as base materials, thus producing a viscosity increase and imparting thixotropic properties to the compositions of the invention. It is, of course, to be understood that it is in no way intended to limit the scope of the present invention by any explanation of the theory or mechanism involved.

It will be noted from the above example that the present compositions are highly thixotropic (see Table II), that is, they have a resistance to shear which decreases with increasing shear rate. In spite of this fact, they can be readily applied as films or coated on or between sheet materials by conventional means such as roller application, knife spreaders, reverse roll coaters, and the like, and equally well further smoothed by the action of rolls, bars, or blades, since they do not have the stringy properties of high polymer dispersions or the viscoelastic properties of the water-insoluble soap gels, such as those formed in wax by aluminum stearates or resinates.

I find it a great advantage to use these molten highly thixotropic compositions in the coating and laminating of sheet materials, since the momentary high shear during their application reduces their effective viscosity, while at the same time they do not migrate through porous base sheets or excessively squeeze out at the edges once the shear is removed, as during cooling and winding and subsequent operations. They are particularly advantageous in applications requiring heavy weights or thicknesses of coatings or laminants. Since low viscosity compositions have a great tendency to flow out of coating nips and over the edges of the sheet materials to which they are applied when their thickness exceeds about one (1) mil, my compositions have an advantage in that they can easily be applied in any thicknesses desired, up to as great as, for example, thirty (30) mils. This is obviously advantageous in obtaining continuous pinhole-free films of wax on or between sheets.

The following example illustrates typical hydrated porous adsorbents which I have found useful.

EXAMPLE 5

Compositions were made up containing three percent of cocoanut oil fatty acid amides (Armid C), ten percent hydrous adsorbent, and 87% liminating and coating microcrystalline wax (Quaker State L-500). All were prepared according to the procedure of Example 4. Table III gives the results obtained:

*Table III*

| Adsorbent | Viscosity, cps. at 260-270° F. | |
|---|---|---|
| | 20 r.p.m. | 2 r.p.m. |
| Attapulgite powder having a particle size range from about two to about .02 microns, having an average particle size of .12 micron and containing 17% free moisture (Attagel 30) | 1,120 | 8,200 |
| Aluminum silicate (Hydrated at 100% R.H.) | 340 | 700 |
| Hydrated alumina (Alcoa C-750) | 400 | 850 |

It is important that the adsorbent powder used in my compositions contain some water of hydration or crystallization as illustrated by the following example.

EXAMPLE 6

Attapulgite powder (Attagel 20) was heated in an oven at 300° F. for twenty-four hours. This was incorporated into a composition containing 100 parts of the dry attapulgite, thirty parts of hydrogenated tallow acid amides (Armid HT), and 870 parts of 150° F. melting point microcrystalline wax. After mixing as in Example 4, viscosity was only eighty centipoises at 260° F. A like composition except substituting hydrated attapulgite containing seventeen percent free and bound moisture gave a viscosity of 430 centipoises.

A quite unique and valuable property of my novel compositions is their resistance to thinning at elevated temperatures. With hot melts previously employed in paper coating and laminating, viscosity falls rapidly with increasing temperature. I have found that the compositions described herein do not lose viscosity on heating but, conversely, slightly increase in viscosity or remain unaffected. FIGURE I is a graphic depiction of viscosity-temperature curves of a typical composition of the present invention as compared to the same type of curve for a wax-butyl rubber-resin composition of the prior art, both obtained in a series of experiments designed to allow such evaluation.

In FIGURE I, the conventional laminant "B" is a commonly employed mixture of 3.9 percent synthetic rubber in laminating grade microcrystalline wax containing ten percent glyceryl ester of hydrogenated rosin (Staybelite Ester 10) whereas Laminant "A" is a composition according to the invention of 1.5 percent hydrogenated tallow amides (Armid HT), ten percent powdered attapulgite containing seventeen percent moisture content (Attagel 20), and 88.5 percent of 150°–160° F. melting Pennsylvania grade microcrystalline wax. As will be noted from FIGURE I, Composition A was thixotropic and increased in viscosity with increased temperature at all r.p.m. test levels while Composition B (which was not thixotropic) rather decreased in viscosity with an increase in temperature. As already stated, if a non-hydrated adsorbent powder or if a surface activator alone are employed, these fail to give a viscosity increase over that obtained by use of the adsorbent alone, and moreover do not produce thixotropic properties. The combination of the hydrated adsorbent powder *and* the surface activator is required, and water of hydration of the adsorbent must be removed in the presence of the surface activator to obtain the desirable enhanced viscosity and thixotropic properties evidenced by the graph of FIGURE I.

I find that I may use from about three to about thirty percent of hydrous adsorbent powder, and from about one-half to about fifteen percent of surface activator in my compositions, depending somewhat on the materials chosen and the viscosity desired. The petroleum wax base will vary from about 55 to about 96.5 percent by weight. Within this composition range, the viscosity of the compositions will range from 100 to 10,000,000 centipoises when measured on a Brookfield Synchroelectric Viscometer or other viscometer of rotational type, using spindle speeds of ten r.p.m. or less.

The following list gives examples of additional compositions useful in the practice of this invention and their intended use.

| | Composition | Application | End use |
|---|---|---|---|
| a | 15% Attapulgite (powder)<br>4% Stearamide<br>81% Microcrystalline wax | Coating for cellophane. | Cheese wrapper. |
| b | 10% Attapulgite (powder)<br>2% Tallow acid amides (Armid HT)<br>2% TiO₂<br>5% Polyethylene (12,000 MW)<br>41% Paraffin wax (130-140° F. M.P.)<br>40% Microcrystalline wax (e.g., 150-160° F. M.P.) | Coating for paper, foil and films. | Heat Sealing pouches and bags Locker wrappers. |
| c | 5% Hydrated alumina (powder)<br>5% Attapulgite (powder)<br>5% TiO₂<br>3% Dodecyl amide<br>42% Microcrystalline wax<br>40% Paraffin wax | Coating for paper and films laminant for papers. | Labels, cartons, overwraps, pouches, shelf papers, meat papers. |

Various types of pigments and colors may be added to my compositions, as I have found that the compositions of the invention have a high capacity to carry pigments without undue settling. For example, titanium dioxide ($TiO_2$) will settle out of molten wax very quickly.

In my compositions, on the other hand, TiO₂ does not settle out when held molten for several hours to several days with no agitation. It is to be further understood that other wax modifiers may be added to these compositions to obtain specific properties. Typical of these materials are polyolefins, rosin derivatives, synthetic and natural rubbers, antioxidants, antimycotics, light screening agents, and cellulose ethers. Due to the high carrying power of my compositions, other additives do not necessarily have to be wax soluble, but may simply and conveniently be present in a finely divided or colloidal state.

It is to be understood that the invention is not limited to the exact details of operation or the exact compounds or compositions shown and described, as obvious modifications and equivalents will be apparent to one skilled in the art, wherefore the invention is to be limited only by the scope of the appended claims.

I claim:

1. A composition suitable for coating and laminating sheet materials consisting essentially of a petroleum wax base in an amount of about 55 to about 96.5 parts, a hydrous adsorbent inorganic powder, capable of a decrease of pore diameter upon dehydration, in an amount of about three to about thirty parts, and a surface activator which is a fatty acid amide having at least one aliphatic group of at least 8 carbon atoms in an amount of about one-half to about fifteen parts, said composition resulting from the admixture of the named ingredients under conditions which operate to expel water of hydration of the hydrous adsorbent powder in the presence of the wax base and the surface activator, and characterized by a thixotropic viscosity of from about 100 to about 10,000,000 centipoises when measured at about 220° F. to about 270° F. with a rotational viscometer at a spindle speed of less than ten r.p.m.

2. A wax composition suitable for coating and limanating sheet materials comprising a hydrocarbon wax base in an amount of about 55 to about 96.5 parts, a hydrous adsorbent inorganic powder, capable of a decrease of pore diameter upon dehydration, in an amount of about three to about thirty parts, and a surface activator which is a fatty acid amide having at least one aliphatic group of at least 8 carbon atoms in an amount of about one-half to about fifteen parts, said composition resulting from the admixture of the named ingredients under high shear within a temperature range of about 220° F. to amout 400° F., and characterized by a thixotropic viscosity of about 100 to about 10,000,000 centipoises when measured at about 220° F. to about 270° F. with a rotational viscometer at a spindle speed of less than ten r.p.m.

3. The composition of claim 2 wherein the hydrous adsorbent inorganic powder is selected from the group of natural minerals consisting of attapulgite, fuller's earth, hectorite, illite, saponite, bauxite, and hydrous adsorbent montmorillonite clays.

4. The composition of claim 2 wherein the hydrous adsorbent inorganic powder is selected from the group of chemically regenerated materials consisting of hydrated alumina, magnesium aluminum silicate, hydrated silica gel, and synthetic zeolite.

5. The composition of claim 2 wherein the wax base is essentially microcrystalline wax.

6. The composition of claim 2 wherein the wax base contains a major portion of microcrystalline petroleum wax and a minor portion of paraffin wax.

7. The composition of claim 2 wherein the wax base is essentially microcrystalline petroleum wax, and the hydrous adsorbent inorganic powder is hydrated attapulgite powder.

8. The composition of claim 2 wherein the surface activator is an amide of the mixed fatty acids derived from hydrogenated tallow.

9. The composition of claim 2 wherein the surface activator is an amide of the mixed fatty acids derived from cocoanut oil.

10. A composition suitable for coating and laminating sheet materials consisting essentially of about 55 to about 96.5 parts of microcrystalline petroleum wax having a melting point of about 130° F. to about 200° F., a needle penetration of about ten to about sixty, and a refractive index measured at 210° F. with a sodium D line of about 1.4325 to about 1.4450, from about one-half to about fifteen parts of a surface activator which is a fatty acid amide having at least one aliphatic group of at least 8 carbon atoms, and from about three to about thirty parts of an adsorbent hydrous inorganic powder, capable of a decrease of pore diameter upon dehydration, said composition resulting from admixture of the named ingredients within a temperature range of about 220° F. to about 400° F. and subjection of the mixture to high shear.

11. A composition suitable for coating and laminating sheet materials consisting essentially of about 55 to about 96.5 parts of petroleum wax having a urea adductibility in excess of fifty percent, about three to about thirty parts of a hydrous adsorbent mineral powder, capable of a decrease of pore diameter upon dehydration, and from about one-half to about fifteen parts of a surface activator which is a fatty acid amide having at least one aliphatic group of at least 8 carbon atoms, said composition resulting from admixture of the named ingredients within a temperature range of about 220° F. to about 400° F. and subjection of the mixture to high shear.

12. The method of producing a composition suitable for laminating and coating sheet materials which includes the steps of mixing a surface activator which is a fatty acid amide having at least one aliphatic group of at least 8 carbon atoms and a hydrous adsorbent inorganic powder, capable of a decrease of pore diameter vated temperature, and further mixing the reactants upon dehydration, with molten petroleum wax at an elevated temperature, and further mixing the reactants and maintaining an elevated temperature until substantial expulsion of water of hydration from the adsorbent powder in the presence of the wax base and the surface activator is effected, and until a thixotropic viscosity in excess of 100 centipoises, when measured within a temperature range of about 220 to 270° F. with a rotational viscometer at a spindle speed of less than ten r.p.m., is established.

13. The method of producing a composition suitable for laminating and coating sheet materials which includes the steps of mixing a surface activator which is a fatty acid amide having at least one aliphatic group of at least 8 carbon atoms and a hydrous inorganic adsorbent powder, capable of a decrease of pore diameter upon dehydration, into a molten hydrocarbon wax at a temperature between the melting point of said wax and about 300° F., continuing the mixing until water of hydration of said mineral adsorbent powder is substantially discharged, and subjecting the mixture to high shear until a thixotropic viscosity in excess of 100 centipoises, when measured in a range of about 220° F. to 270° F. with a rotational viscometer at a spindle speed of less than ten r.p.m., is established.

14. The method of producing a composition suitable for laminating and coating sheet materials which includes the steps of dispersing a hydrous adsorbent inorganic powder, capable of a decrease of pore diameter upon dehydration, in molten hydrocarbon wax within a temperature range of about 220° F. to about 280° F. and discharging free water therefrom by heating and stirring, dissolving therein a surface activator which is a fatty acid amide having at least one aliphatic group of at least 8 carbon atoms and further heating and stirring until water of hydration is substantially discharged from said adsorbent powder, and subjecting the mixture to high shear until a thixotropic viscosity in excess of 100 centipoises, when measured in a range of from 220° F. to 270° F. with a rotational viscometer at a spindle speed of less than ten r.p.m., is established.

15. The method of claim 13 wherein the hydrous adsorbent powder is attapulgite powder and the surface activator is a tallow acid amide.

16. The method of claim 15 wherein the wax is microcrystalline wax.

17. The method of claim 13 wherein the hydrocarbon wax is microcrystalline wax in the amount of about 55 to about 96.5 parts, the surface activator is a mixture of amide derived from tallow fatty acids in the amount of about one-half to fifteen parts, and the hydrous adsorbent is powdered by hydrated attapulgite in the amount of about three to about thirty parts.

18. The method of claim 13 wherein the surface activator comprises about one-half to about fifteen percent of cocoanut oil fatty acid amides, the hydrous mineral adsorbent consists of about three percent to about thirty percent powdered attapulgite, and the balance is essentially microcrystalline wax having a melting point of about 130° F. to about 200° F.

19. A composition of claim 2 containing a member selected from the group consisting of pigments and colors.

20. A film of a composition according to claim 2.

21. A laminated sheet material consisting of two sheet materials adhesively united with a composition of claim 2, at least one of which is fibrous.

22. A laminated sheet material consisting of two fibrous sheet materials adhesively united with a composition of claim 2.

23. A coated sheet material coated with a composition of claim 2.

24. A carton blank produced from a sheet material including at least one fibrous sheet material carrying a composition according to claim 2 on at least one surface thereof.

25. A carton produced from a sheet material including at least one fibrous sheet material carrying a composition according to claim 2 on at least one surface thereof.

References Cited by the Examiner

UNITED STATES PATENTS

| | | | |
|---|---|---|---|
| 2,559,398 | 7/1951 | Capell | 106—270 |
| 2,623,852 | 12/1952 | Peterson | 252—49 XR |
| 2,847,367 | 8/1958 | Walsh et al. | 106—270 XR |
| 2,971,922 | 2/1961 | Clem | 252—316 |
| 3,049,498 | 8/1962 | Sawyer | 252—316 |

ALEXANDER H. BRODMERKEL, *Primary Examiner.*

J. B. EVANS, *Assistant Examiner.*